United States Patent Office 3,394,567
Patented July 30, 1968

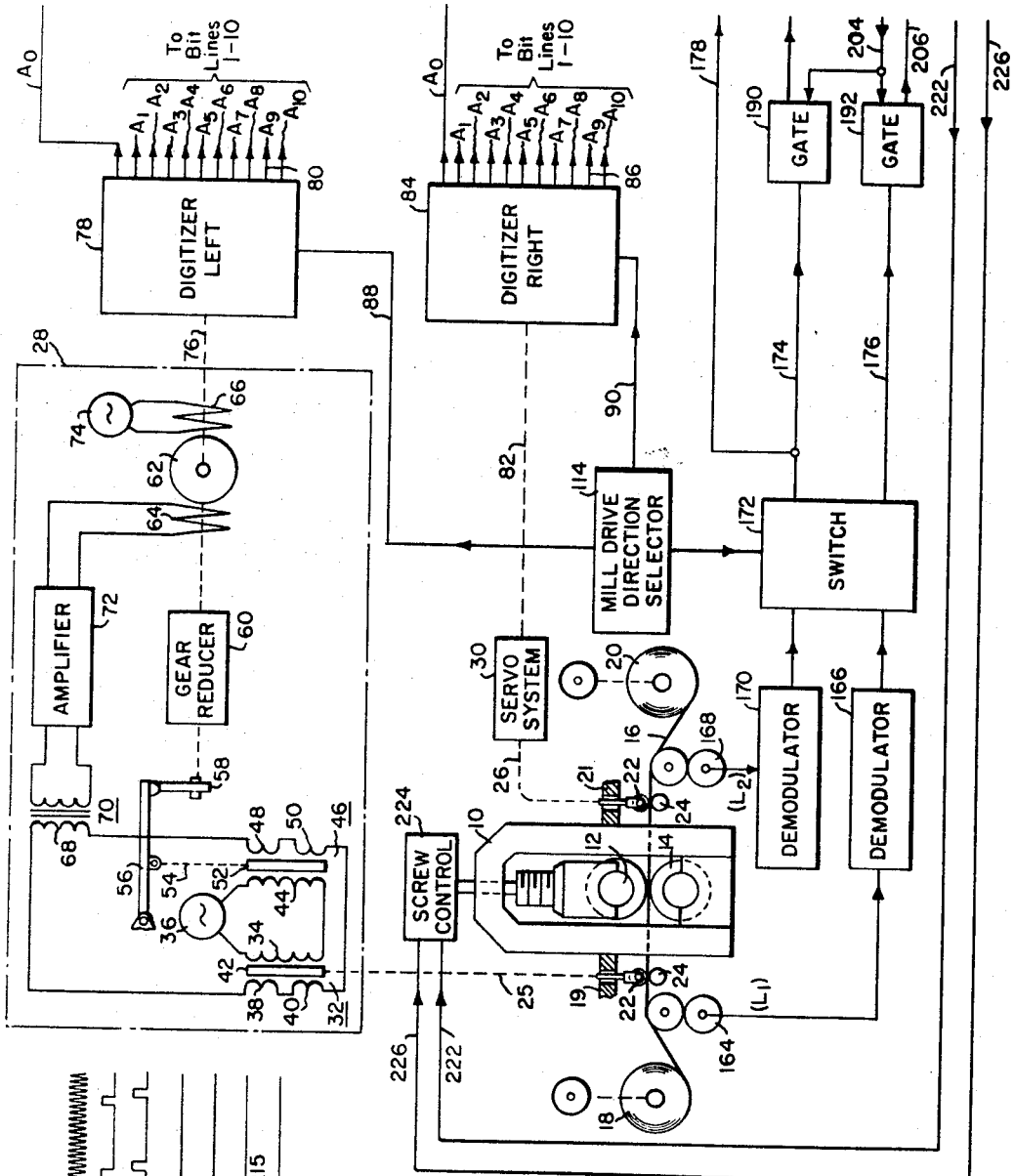

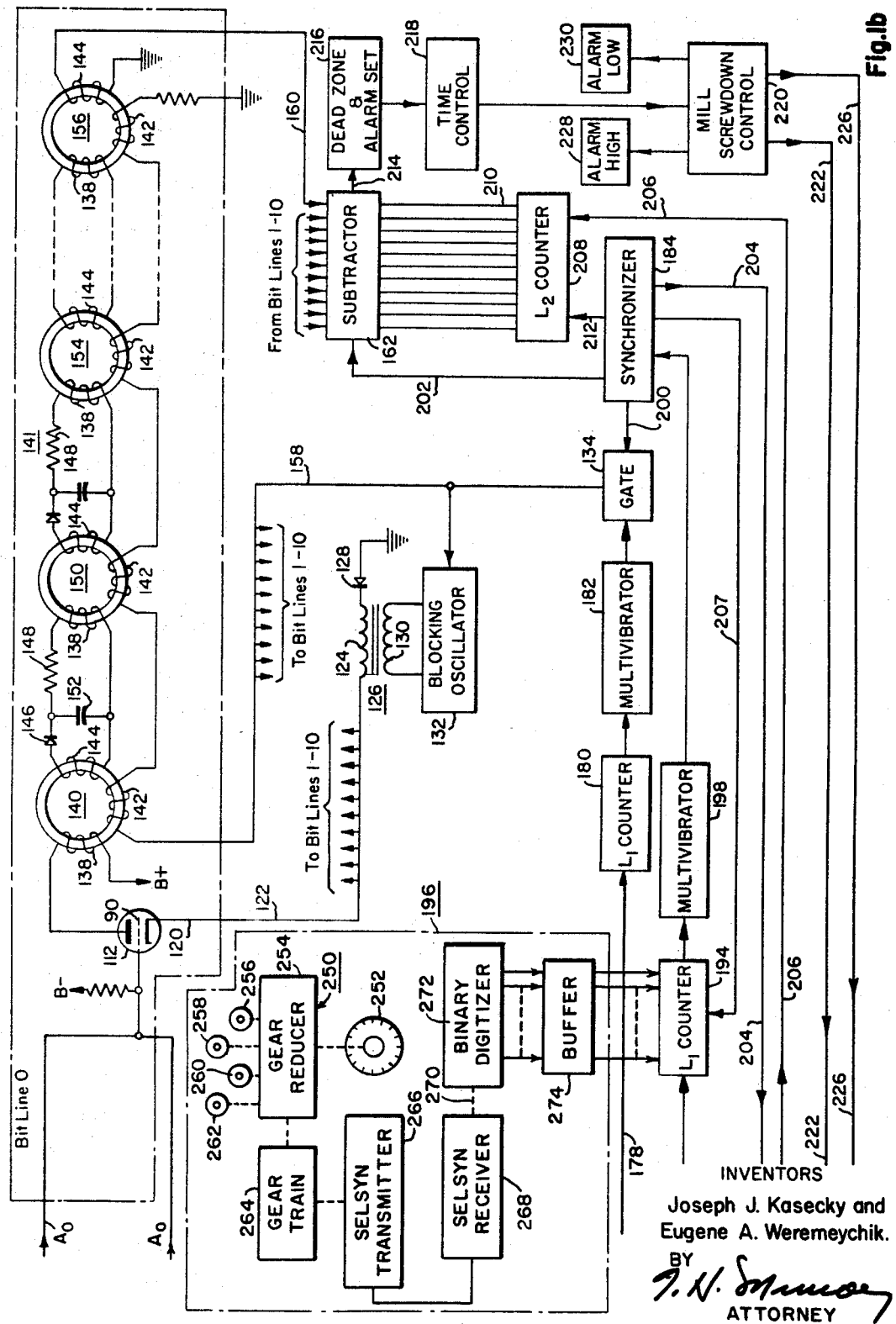

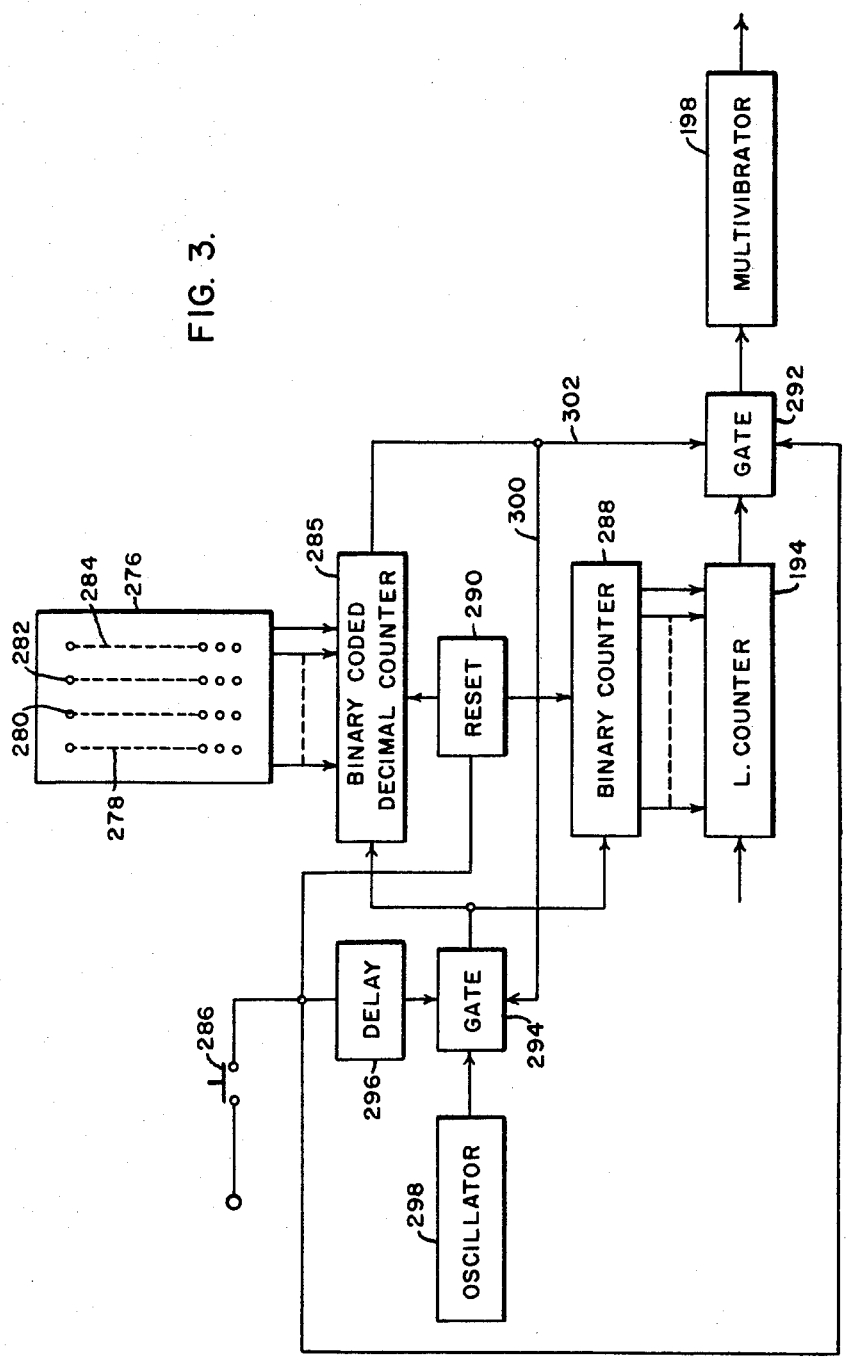

3,394,567
AUTOMATIC CONTROL SYSTEM FOR ROLLING MILLS
Joseph J. Kasecky, New Kensington, and Eugene A. Weremeychik, Brackenridge, Pa., assignors to Allegheny Ludlum Steel Corporation, Brackenridge, Pa., a corporation of Pennsylvania
Filed Oct. 6, 1965, Ser. No. 493,381
7 Claims. (Cl. 72—9)

ABSTRACT OF THE DISCLOSURE

An automatic system for controlling rolling mills and the like based upon the constant volume principle and incorporating means under the control of the operator for changing the desired output gage of the material issuing from the mill without shutting down the mill.

---

In U.S. Patents Nos. 3,015,974 and 3,121,354, rolling mill control systems are described which are based on the concept that the volume of material coming out of the mill must be equal to the volume entering the mill. In such systems, transport time and measuring time are essentially zero, meaning that the system measures and controls the mill directly at the bite of the mill rolls rather than ahead of the rolls as in previous control systems of this type. By reference to the aforesaid patents, it can be seen that, based upon the constant volume principle, an error signal for controlling the mill screwdown can be derived based upon the equation:

$$\text{Error} = G_1 - \frac{L_2}{L_1} G_{2d}$$

where $L_1$ = length of material entering the mill;
$L_2$ = length of material leaving the mill;
$G_1$ = actual gage of material entering the mill; and
$G_{2d}$ = predetermined desired gage of material leaving the mill.

Electrical quantities representing the factors $L_1$ and $L_2$ can be obtained from tachometer-type pulse generators at the entrance and exit ends of the mill; while the factor $G_1$ can be obtained from a thickness gage at the entrance end of the mill. The factor $G_{2d}$, on the other hand, is controlled by the mill operator, as determined by the desired gage of the finished product leaving the mill. That is, the mill operator manually manipulates a device capable of producing an electrical quantity proportional to $G_{2d}$. By applying the electrical quantities representative of $L_1$, $L_2$, $G_1$ and $G_{2d}$ into suitable electrical computer apparatus for solving the foregoing equation, an error signal for the mill screwdown can be derived.

In systems such as those shown in U.S. Patents Nos. 3,015,974 and 3,121,354, it is necessary to feed the quantity $G_{2d}$ into the computer apparatus in binary notation. The operator, however, is provided with control apparatus which indicates the gage in decimal notation. In one specific control system, for example, the operator is provided with a panel having rows of pushbutton switches, each row having ten pushbuttons therein. If, for example, it is desired to roll metal strip material having a gage of 0.0250 inch, the operator pushes the 0 pushbutton in the first row, the 2 pushbutton in the second row, the 5 pushbutton in the third row, the 0 pushbutton in the fourth row, and so on. These switch closures, in turn, are used to preset a decimal counter; and after the operator has depressed the proper pushbuttons for a particular gage, he then closes another switch which causes pulses from an oscillator to be fed into the decimal counter. The same pulses are fed into a binary counter; and this action continues until the count to which the decimal counter is set by the operator is reached, at which point both counters are stopped. At this stage, the binary counter has stored therein the desired gage in binary notation; and this is transferred electrically to a counter in the aforesaid computing apparatus for the equation:

$$\text{Error} = G_1 - \frac{L_2}{L_1} G_{2d}$$

In order to change gage, both counters must be reset, selected pushbuttons depressed, and pulses again fed to both counters until the desired count is reached.

Needless to say, the foregoing procedure is a somewhat cumbersome method for introducing the factor $G_{2d}$ into the computing apparatus and involves the use of a large amount of rather expensive electronic circuitry. Possibly more important, however, is the fact that it does not enable the operator to change gage while the mill is operating. That is, if the operator were to reset the counters while the mill was operating, the factor $G_{2d}$ would return to zero and would remain zero until the operator had again depressed the desired pushbuttons and the counters had again counted up to the desired gage setting. Consequently, with such systems, it was always necessary to take the mill out of automatic operation to change gage, even though the change might involve no more than one-ten thousandth of an inch.

As one object, the present invention provides a rolling mill control system based on the constant volume principle in which the desired output gage can be changed while the mill is in operation.

Another object of the invention is to provide a rolling mill control system based on the constant volume principle wherein an electrical quantity representative of desired output gage can be introduced into the computing apparatus of the system with fewer and less expensive components than were heretofore believed to be necessary.

Another object of the invention is to provide a rolling mill control system based on the constant volume principle wherein a counter is preset by means of a binary digitizer, the digitizer being set by means of mechanical rotation of a microdial.

The above and other objects and features of the invention will become apparent from the following detailed description taken in connection with the accompanying drawings which form a part of this specification, and in which:

FIGURES 1A and 1B form a composite overall schematic and block diagram of one embodiment of the invention;

FIG. 2 is an illustration of wave forms appearing at various points in the circuit of FIGS. 1A and 1B; and FIG. 3 is a partial block and schematic circuit diagram showing an alternative embodiment of the invention which is completely illustrated in FIGS. 1A and 1B.

Referring now to the drawings, and particularly to FIGS. 1A and 1B, a conventional rolling mill 10 is provided with pressure rolls 12 and 14 between which passes the material 16 being acted upon or processed in the mill. In the particular illustration given, the material 16 comprises a continuous strip which feeds off payoff reel 18 and is coiled onto take-up reel 20. However, the direction of movement of the strip material through the mill 10 may be reversed, whereupon the reel 20 will become the payoff reel and reel 18 will become the take-up reel.

Positioned on either side of the mill 10 are a pair of gage heads 19 and 21, each of which supports a vertically movable roller 22 positioned above the strip as well as a fixed roller 24 below the strip. Connected to the vertically movable rollers 22 through linkages 25 and 26 are servosystems 28 and 30, respectively. Only the servosystem 28, enclosed by broken lines, is shown in detail herein, it being understood that the other servosystem 30 is identical in structure and operation. As the strip 16 passes through the gage head 19, for example, the gaging rollers 22 and 24 will be in rolling contact with its opposite surfaces; and as the thickness or gage of the material varies, the upper gaging roller 22 will move upwardly or downwardly, depending upon whether the strip 16 increases or decreases in thickness. That is, when the thickness of the strip 16 increases, the gaging roller 22 and linkage 25 will move upwardly; whereas, when the thickness of the sheet decreases, these members will move downwardly.

In order to sense the position of the gaging roller 22 and linkage 25, there is provided an electromechanical transducer, generally indicated at 32, which produces an electrical output which varies in proportion to the movement of roller 22. The transducer includes a center or primary coil 34 which is connected to a source of alternating current 36. At either end of the primary or center coil 34 and coaxial therewith are a pair of secondary coils 38 and 40. A rod-shaped magnetically permeable core 42 is positioned axially inside the coil assembly and provides a path for the magnetic flux linking the coils. Core 42 is connected to the linkage 25 whereby the coil will be moved upwardly or downwardly depending upon the direction of movement of the roller 22. In series with the primary winding 34 of transducer 32 is the primary winding 44 of a second electromechanical transducer 46 which is similar in construction to transducer 32 and includes a pair of secondary coils 48 and 50 as well as a movable, magnetically permeable core 52. In this case, however, the core 52 is connected through a mechanical linkage 54 to a lever 56 which is controlled by means of a cam 58. The cam 58, in turn, is connected through gear reducer 60 to a two-phase servomotor 62 having two phases or windings 64 and 66 included therein.

With reference to transducer 32, when the primary or center coil 34 is energized with alternating current from source 36, voltages are induced in the other two coils 38 and 40. These secondary coils are connected in series opposition, meaning that the two voltages in the secondary circuit are opposite in phase whereby the net output of the transformer is the difference of the voltages. For one central position of the core, this output voltage will be zero. When the core 42 is moved from this central position, the voltage induced in the coil toward which the core is moved increases, while the voltage induced in the opposite coil decreases. This produces a differential voltage output which with proper design varies linearly with a change in core position. The motion of the core in the opposite direction beyond the central position produces a similar linear voltage characteristic, with the phase shifted 180°. Operation of transducer 46 is identical to that of transducer 32 and, thus, by proper positioning of the cores 42 and 52 in the respective transducers, the cumulative or output voltage produced across their respective secondary windings can be made equal and opposite in phase. These secondary windings are connected in series differential across the primary winding 68 of an input transformer 70. Thus, when the output voltages produced across the secondary windings of the respective transducers are equal and opposite in phase, the voltage appearing across the primary winding 68 will be zero. If the cores 42 and 52 are initially positioned so that zero output voltage is produced across winding 68, and if core 42 is thereafter moved upwardly, the output voltages produced across the secondary windings of the transducers will no longer balance, and a voltage will appear across winding 68. If the core 42 moves downwardly from a balanced condition, then a voltage will again appear across winding 68, but in this case it will be shifted in phase with respect to the voltage produced when it moved upwardly from the balanced condition. The voltages appearing across the secondary winding of transformer 70 are applied to an amplifier 72, the output of which is connected across one of the windings 64 of the two-phase servomotor 62. The other winding 66 of servomotor 62 is connected as shown to a source of alternating current voltage 74 which is in phase with voltage source 36. In actual practice, the two voltage sources 36 and 74 will probably be the same, but are shown herein separately for purposes of explanation.

With the arrangement described, the servomotor 62 will rotate in one direction or the other, depending upon the phase of the signal applied through winding 64. This phase will, in turn, depend upon the relative positions of cores 42 and 52 in their respective transducers as was explained above.

The gear ratio of gear reducer 60 is on the order of two-hundred to one, meaning that servomotor 62 will have to make two-hundred revolutions before the cam 58 rotates through 360°. The arrangement is such that if core 42 in transducer 32 moves upwardly, for example, motor 62 will rotate the cam 58 to lower core 52 in transducer 46 until the voltages at the secondaries of the transducers balance and the servomotor stops. That is, as the core of transducer 32 is moved upwardly by roller 22 in response to an increase in the thickness of strip 16, the coupling is increased between its primary winding 34 and secondary winding 38, and the voltage applied to the amplifier 72 increases. With this increase in voltage, the servomotor 62 drives the core of transducer 46 downwardly until the output voltages at the respective secondary windings are equal and the voltage appearing across winding 68 of input transformer 70 is zero. At this point the motor stops, and what has actually been done is to convert an electrical signal proportional to the change in strip thickness into a proportional rotary motion of the servomotor 62. That is, any change in thickness of the strip 16 as it passes through the gage head will induce a proportional number of revolutions in the servomotor 62 until the two transducer outputs again balance. If the thickness of the strip 16 decreases and the core 42 moves downwardly, the phase of the signal applied to the servomotor 62 will be reversed, and the cam 58 will be rotated to lower the core 52 in transducer 46.

The servomotor 62 is also connected through a mechanical connection 76 to a binary digitizer, generally indicated at 78. The digitizer is essentially a rotary switching device for energizing particular relays which represent bits in a binary number. In the particular illustration given, the digitizer 78 will produce an electrical signal comprising eleven binary output bits which appear on leads 80. For a full and complete description of the digitizer, reference may be had to U.S. Patent No. 3,056,208, issued Oct. 2, 1962, and assigned to the assignee of the present application. Although the digitizer shown in that patent produces a decimal rather than a binary output, the conversion from decimal to binary notation will be obvious to those skilled in the art. Thus, a binary number A, for example, will be represented by ($A_0$, $A_1$, $A_2$, $A_3$, etc.) where $A_0$ is the binary bit $2^0$, $A_1$ is the binary bit $2^1$, $A_2$ is the binary bit $2^2$, $A_3$ is the binary bit $2^3$, and so on. Each of the binary bits is represented on leads 80 by an ON or OFF signal, representing a "one" or "zero," respectively in binary notation. Thus, if the output leads from the digitizer 78 representing the $A_0$ and $A_3$ bits are ON or "one" while all other leads are OFF or "zero," it means that the output of the digitizer is $2^0 + 2^3$, or $1 + 8$ which is 9. Similarly, if only the $A_1$ and $A_2$ leads are ON or "one" while all other leads are OFF or "zero," the signal represented is $2^1 + 2^2$, or $2 + 4$ which is 6. Also included in the servo system 28 is apparatus, not shown, for automatically zeroing the system when the two rollers 22 and 24 are in contact with each other. This apparatus forms no part of the present invention, but is fully shown and described in the aforesaid U.S. Patent No. 3,056,208.

As shown in FIG. 1A, the servosystem 30 is also connected through a mechanical linkage 82 to a second digitizer 84 having eleven output leads 86. The corresponding output leads from the digitizers 78 and 84 are each connected to a bit line, only one of said lines being shown in detail in FIG. 1B and identified as "bit line 0." Thus the $A_0$ leads from both digitizers 78 and 84 are connected to bit line 0, the $A_1$ leads from each digitizer will be connected to bit line 1, the $A_2$ leads from each digitizer will be connected to bit line 2, the $A_3$ leads from each digitizer will be connected to bit line 3, and so on.

Included in the circuit is a mill drive direction selector 114 which, among other things, serves to control the mill drive, not shown, to selectively reverse the direction of strip movement through the mill. The mill drive direction selector also controls the digitizers 78 and 84 through leads 88 and 90, respectively. That is, when the strip is moving from left to right as shown in FIG. 1A, the selector 114 will serve to enable or switch on the digitizer 78 whereby binary bits will appear on leads 80. At the same time, the selector 114 applies a signal to lead 90 to disable or switch off the digitizer 84. When, however, the direction of strip movement is reversed (i.e., from right to left in FIG. 1A) digitizer 78 will be disabled while digitizer 84 is enabled to produce binary bits on output leads 86. Thus, only one set of binary bits from digitizer 78 or 84 will pass into the respective bit lines 0–10.

All of the bit lines 1–10 are identical in construction to bit line 0 shown in detail in FIG. 1B. With reference to this first bit line, it includes an electron valve 112 having its grid 90 connected to the $A_0$ leads from each of the digitizers 78 and 84, it being understood that only one of these leads will be operative to pass ON signals at any time, depending upon the direction of strip movement through the mill. The cathode 120 of valve 112 is connected through lead 122 to one end of the secondary winding 124 of a transformer 126, the other end of the winding 124 being connected through a unidirectional current device 128 to ground. The primary winding 130 of transformer 126 is connected to a blocking oscillator 132 which receives a trigger pulse from a gate circuit 134, the arrangement being such that the output of the blocking oscillator will be a pulse each time a trigger pulse is received from gate circuit 134, however the output pulse of the blocking oscillator will be delayed with respect to the input trigger pulse from circuit 134. The delayed output pulse from the blocking oscillator is then coupled through transformer 126 to lead 122 to thereby apply a negative potential to the cathode 120 and enable the electron valve 112 to pass ON signals from digitizer 78 or 84 as the case may be. At all other times, however, the valve 112 is disabled. Lead 122 is also connected to the cathodes 120 in each of the remaining bit lines 1–10 where the action is the same as that described with respect to bit line 0.

The anode 136 of the tube 112 is connected to a source of anode voltage, designated B+, through the input winding 138 of a first circular magnetic core 140 in an entry gage memory unit 141 which serves to store and advance successive actual entry gage measurements from valve 112 in synchronous correlation with the movement of strip 16. That is, each time the valve 112 is enabled by blocking oscillator 132, it feeds the instantaneous entry gage measurement in binary form from digitizer 78 or 84 to the storage unit which progressively advances these instantaneous measurements from one end of the unit to the other end, the time required to advance from one end to the other being equal to the time required for the strip 16 to travel from the rollers 22 and 24 to the bite of the mill 10.

Also included on the core 140 in the memory unit is a shift winding 142 and an output winding 144 which is connected through diode 146 and resistor 148 to the input winding 138 of a second circular magnetic core 150. As shown, a capacitor 152 is connected between the junction of diode 146 and resistor 148 and the other end of the output winding 144. Core 150 is identical to core 140 and includes an input winding 138, a shift winding 142 and an output winding 144. Core 150, in turn, is coupled to core 154 and this core, in turn, is connected to the next succeeding core in the chain. In the particular embodiment of the invention shown herein, it will be assumed that there are ten such cores connected in cascade, the last or tenth core being designated by the numeral 156.

Each of the cores 140, 150, 154, etc., is formed from permanent magnet material and may have a flux remaining in either of two directions depending upon the last direction of the magnetizing current. In the illustration given, the input current in winding 138 can cause flux to flow in core 140, for example, in a clockwise direction while the shift current in winding 142 can cause flux in the counterclockwise direction. Current will flow in the output diode 146 only when the flux changes from clockwise to counterclockwise direction. Thus, a "one" or ON bit can be stored in the first core 140 by passing current through the input winding 138. The "one" or ON bit can then be transferred to the second core by passing current through the shift winding 142. As shown, all of the shift windings 142 are connected in series to lead 158 which, in turn, is connected to the output of gate circuit 134. Consequently, all of the cores in the chain are shifted simultaneously. When a shift pulse is applied to the shift windings 142, a "one" or ON bit in the first core 140, for example, will be transferred to the second core 150. As the flux changes, the diode 146 conducts and stores a charge in the capacitor 152. Before the capacitor 152 can discharge, however, the core 150 will have already received a shift pulse to transfer its information onto core 154. Thus, when the capacitor 152 does discharge, the information which was stored on the first core is transferred to the second core 150 by action of the capacitor 152 discharging through the input winding 138 of this core. Information can flow only one way due to the diode and due to the ratio of turns between the input and output windings. Thus, the capacitors 152 act as a temporary storage medium while the cores are reset to zero. If there is no input current from the next shift current pulse, the first core will be in the "zero" state with counterclockwise flux. Hence, the shift current cannot change the flux, no current will charge the capacitor, and the following core will remain reset, thus shifting the "zero" or OFF binary bit from the first core to the second core.

With the arrangement described, each bit will be transferred from one core to the other until the final core 156 is reached. The output winding 144 of this core is then connected through lead 160 to a parallel binary subtracter 162 which also receives the outputs from the other bit lines 1–10. As the input gage of the strip material varies, this variation will be detected by the servosystem 28 so that the output of digitizer 78, for example, will be constantly changing, assuming that the input gage is also changing. However, by virtue of the fact that the electron valve 112 conducts only at periodic intervals, samples of the input gage will be passed through bit lines 0–10 at periodic intervals also. As will hereinafter be explained, a sample of the input gage is passed to the cores 140, 150, 154, etc., each time the strip 16 moves through six inches of travel. Since there are ten such cores connected in cascade, the strip will have to travel sixty inches or five feet before the output information arrives at the binary subtracter 162. By positioning the rollers 22 and 24 five feet from the bite of the mill, it will be appreciated that when the input gage information arrives at the subtracter 162, the increment of strip having that particular gage will be directly at the bite of the mill.

Reverting again to the rolling mill 10, input strip length ($L_1$) is sensed by equipment similar to that described in U.S. Patent No. 2,982,158, issued May 2, 1961, namely a pulse generator 164 and a demodulator unit 166. Similarly, output strip length ($L_2$) is sensed by a pulse generator 168 and demodulator unit 170. As shown, the outputs of the demodulators 166 and 170 are connected through switch means 172 to leads 174 and 176. The switch means 172 is controlled by the mill drive direction selector 114, the arrangement being such that when the strip 16 is traveling from left to right, the output of pulse generator 164 which represents input strip length ($L_1$) is connected to lead 174, and the output of pulse generator 168 which represents output strip length ($L_2$) is connected to lead 176. When, however, the direction of strip travel through the mill is reversed, the switch 172 will reverse the connections between the demodulators 166 and 170 and the leads 174 and 176. That is, when the strip is traveling from right to left, the output of pulse generator 168 will then represent input strip length ($L_1$) so that the demodulator 170 will then be connected to lead 174 rather than lead 176. Similarly, under the conditions described, the output of pulse generator 164 will represent the output strip length ($L_2$) so that the demodulator 166 will now be connected to lead 176 rather than lead 174.

For purposes of explanation, it will be assumed that the strip is traveling from left to right so that the output of pulse generator 164 is connected to lead 174 while the output of pulse generator 168 is connected to lead 176. Connected to the lead 174 is another lead 178 which applies the pulses or oscillations representing the input strip length ($L_1$) to a first $L_1$ counter 180 which may, for example, be of the conventional flip-flop type comprising a plurality of multivibrators connected in cascade. The counter 180 is preset whereby it will trigger multivibrator 182 to produce an output pulse whenever the counter 180 reaches the count to which it was preset. In the illustration given, the counter 180 will be preset to trigger multivibrator 182 each time the input strip moves through six inches. Thus, assuming that the gate 134 is not disabled by a synchronizer 184, hereinafter described, a pulse from circuit 182 will pass through the gate 134 to the reset windings 142 on cores 140, 150, etc., and also to the blocking oscillator 132. The output pulse from the blocking oscillator 132, however, will be delayed with respect to that on lead 158 directly from gate 134, the arrangement being such that each of the cores 140, 150, etc., will shift the information stored therein before new information is fed into the system from valve 112.

The pulses or oscillations on leads 174 and 176 are also passed to gate circuits 190 and 192, respectively. The output of gate circuit 190 is then passed to a second $L_1$ counter 194, the count of which is reset by means of a $G_{2d}$ preset circuit 196, enclosed by broken lines and hereinafter described in detail. The $L_1$ counter 194, like counter 180, may comprise any of the well known types having a series of cascade-connected multivibrators. As is well known to those skilled in the art, a counter of this type may be preset by a series of switch closures to count any desired number of oscillations before producing an output pulse.

When the desired number of oscillations or pulses are counted by counter 194, it will produce an output to trigger the synchronizer 184 through multivibrator 198. At this point, the synchronizer will then disable the gate 134 through lead 200 while enabling the parallel binary subtracter circuit 162 through lead 202 to perform a binary subtraction. At the same time, the synchronizer 184 will block gates 190 and 192 through lead 204.

Reverting, now, to gate 192, its output is passed through lead 206 to an $L_2$ counter 208 which will produce a binary output on ten leads 210 which is proportional to the number of oscillations or pulses counted by the $L_2$ counter. The $L_2$ counter is of the well-known type comprising a plurality of cascaded flip-flop circuits and is reset to begin counting from zero by a signal from synchronizer 184 through lead 212. At the same time the $L_2$ counter 208 is reset, the $L_1$ counter 194 is also reset by synchronizer 184 through lead 207, substantially as shown.

It will be remembered that an error signal proportional to the deviation in gage from a desired output gage is derived from the equation:

$$\text{Error} = G_1 - \frac{L_2}{L_1} G_{2d}$$

The factor $G_1$ which is the actual input gage of the strip material directly at the bite of the mill is represented by the binary signal comprising ten ON or OFF bits on leads 160 leading into the parallel binary subtracter 162. Similarly, the binary signal comprising ten ON or OFF bits on leads 210 leading into the subtracter must represent the factor $$\frac{L_2}{L_1} G_{2d}$$

in order to obtain the correct error signal.

The factor $$\frac{L_2}{L_1} G_{2d}$$

is calculated as follows: It will be remembered that the second $L_1$ counter 194 may be preset to count any number of pulses or oscillations by an appropriate number of switch closures in circuit 196. By setting the switch closures so that the desired output gage $G_{2d}$ is equal in magnitude to $L_1$, the error equation becomes:

$$\text{Error} = G_1 - L_2$$

In other words, the $L_1$ counter 194 is set to trigger multivibrator 198 whenever $L_1$ is equal to $G_{2d}$. When this occurs, the synchronizer 184 is actuated by the signal from multi-vibrator 198 to disable the gates 190 and 194 through lead 204 whereby both the $L_1$ counter 194 and the $L_2$ conuter 208 stop counting. The output of the $L_2$ counter at this instant then represents the factor $$\frac{L_2}{L_1} G_{2d}$$

or the desired calculated input gage $\overline{G}_1$. At the same time, the synchronizer enables the subtracter 162 to perform a parallel binary subtraction of the calculated desired input gage ($\overline{G}_1$) from the actual input gage at the bite of the mill ($G_1$) to produce a binary output error signal schematically illustrated by the lead 214.

While the subtraction process is being performed, the synchronizer 184 blocks gate 134 so that no further information can pass through bit lines 0–10 during the subtraction process. After the subtraction process is then completed, the synchronizer will reset the $L_1$ and $L_2$ counters 194 and 208 through leads 207 and 212 and will enable the gates 190 and 192 to pass $L_1$ and $L_2$ pulses or oscillations to the counters to begin a new cycle. In this way, samples of the error signal ($G_1 - \overline{G}_1$) are obtained at spaced points along the strip 16, and the number of samples taken is dependent upon the preset value of $G_{2d}$ in switch closure circuit 196. That is, circuit 196 determines the number oscillations (i.e., the length of the strip) required to produce the signal to trigger the synchronizer 184; and this, in turn, depends upon the desired value of $G_{2d}$.

Operation of the system may possibly best be understood by reference to FIG. 2 where wave form A represents the oscillations ($L_1$) on lead 174. These oscillations, when fed to the first $L_1$ counter 180 will cause the multivibrator 182 to produce an output pulse to gate 134 after every six inches of strip travel. The pulses in wave form B, then, are those which are passed through windings 142 in the cores 140, 150, etc., to shift the cores and advance the information through the memory unit each time the strip travels six inches. The output of the blocking oscillator 132, on the other hand, is represented by wave form C in FIG. 2 where the pulses have the same frequency as those in wave form B but are delayed with respect to the pulses in wave form B. Thus, as was mentioned above, the cores are first shifted to advance information to the memory unit, followed by the introduction of new information into the unit from valve 112.

uring the time that wave forms B and C are being generated, the wave form A is fed also to the second $L_1$ counter 194 which is preset by circuit 196. After the $L_1$ counter 194 has counted a predetermined number of pulses or oscillations in wave form A determined by the setting of circuit 196, it will trigger multivibrator 198 to produce an output pulse 209 in wave form D of FIG. 2. The pulse 209 in wave form D then actuates the synchronizer 184 to produce the pulse 211 in wave form E on lead 202 which enables the binary subtracter circuit 162 to perform a subtraction operation between times $T_1$ and $T_2$. At time $T_2$, a pulse 213 is produced in wave form F, and this pulse is fed through leads 207 and 212 to the $L_1$ and $L_2$ counters to reset them whereby they will again start counting from zero, the pulse in wave form F persisting between times $T_2$ and $T_3$. Wave form G from the synchronizer 184 is fed through leads 200 and 204 to gates 134, 190 and 192. This wave form includes a pulse 215 which starts at time $T_1$ and persists for a short time after $T_3$, thereby disabling the gates 134, 190 and 192 and preventing the feed-in of information to the cores 140, 150, 154, etc., as well as the counters 194 and 208 during the period of subtraction.

The output of the binary subtracter 162 on lead 214 is a binary signal having a magnitude proportional to the difference between the actual measured input gage ($G_1$) and the calculated desired input gage ($\overline{G}_1$). This signal is passed through a dead zone and alarm set circuit 216 and a time control circuit 218 to the mill screwdown control 220. If the output of the subtracter 162 indicates that the gage is above $G_{2d}$, a signal will be fed on lead 222 to the mill screw control 224 to lower the upper roll 12. Similarly, if the output of the subtracter 162 indicates that the gage is below $G_{2d}$, a signal will be fed on lead 226 to the screw control 224 to raise the roll 12. Also connected to the mill screwdown control circuit 220 are two alarms 228 and 230. Alarm 228 will be actuated to signal the operator that the error signal is above a predetermined magnitude while alarm 230 will signal the operator that the error signal is below a predetermined magnitude. In this manner, when the mill initially starts up and the $G_1$ information fed through the storage circuit of cores 140, 148, etc., is obviously incorrect, since it was derived from strip previously rolled, the operator will be appraised of this fact by one of the alarms 228 or 230. Included in the system is switching means, not shown, enabling the operator to place the screw control 224 on either manual or automatic operation wherein the output of the subtracter 162 controls. This enables the operator to control the mill by manual means until the alarm ceases, indicating that the correct $G_1$ information has arrived at the outputs of bit lines 0-10.

Reverting again to the preset circuit 196, it comprises a microdial 250 of the type manufactured by the Helipot Division of Beckman Instruments, Inc. It includes a dial 252 which is rotated by the operator, the dial 252 being connected through a gear reducer 254 to four visual dials 256 and 258 and 260 and 262. The dial 256, for example, visually indicates units, dial 258 indicates tens, dial 260 indicates hundreds and dial 262 indicates thousands. Thus, if it is desired to roll sheet material having a gage of 0.0250 inch, the dial 252 is rotated until dial 262 indicates 0, dial 260 indicates 2, dial 258 indicates 5, and dial 256 indicates 0. The gear reducer 254 is connected through a gear train mechanism 264 to a selsyn transmitter 266 which, in turn, drives a selsyn receiver 268. The selsyn receiver 268 is mechanically connected through linkage 270 in a binary digitizer 272 similar in construction and operation to the binary digitizers 78 and 84 previously described. Thus, as the selsyn receiver 268 rotates the digitizer 272, ON and OFF signals are applied through buffer 274 to preset the desired gage, in binary notation, into the $L_1$ counter 194. The buffer 274 acts as an isolation stage between circuits 272 and 194.

In order to change the desired output gage, the operator simply rotates the dial 252 in one direction or the other until the desired gage is indicated on the dials 256–262. It will be noted, however, that the $L_1$ counter 194 is not reset to zero in this process; and, consequently, the mill need not be stopped in order to change the desired output gage.

In FIG. 3, another embodiment of the preset circuitry 196 is shown. It includes a panel 276 having rows of pushbuttons thereon, one row being for units, another for tens, another for hundreds, and so on. Each row, in turn, is provided with ten pushbuttons such that if the desired gage is 0.0250 inch, the 0 pushbutton in row 278 will be depressed, the 2 pushbutton in row 280, the 5 pushbutton in row 282, and the 0 pushbutton in row 284. The pushbuttons on panel 276 serve to preset a binary coded decimal counter 285, substantially as shown.

After the pushbuttons on panel 278 are depressed, a reset pushbutton 286 must be depressed. When pushbutton switch 286 is closed, the counter 285, as well as a binary counter 288, are reset through circuit 290. At the same time, depression of pushbutton switch 286 serves to disable gate 292 which, in this embodiment, is interposed between the $L_1$ counter 194 and multivibrator 198. Thus, when pushbutton switch 286 is depressed, the $L_1$ counter 194 is no longer connected to the multivibrator 198 and a subtraction operation cannot take place in subtracter 162. Consequently, during the time that the gate 292 is disabled, the mill screwdown 220 remains at its previously established condition.

Shortly after gate 292 is disabled and counters 285 and 288 are reset, a second gate 294 is enabled through delay circuit 296. This connects an oscillator 298 to the inputs of both of the counters 285 and 288. Consequently, both counters will begin counting and will continue to count until the count of counter 285 reaches that determined by the pushbutton depressions on panel 276. At that point, the gate 294 is disabled through lead 300; and at this instant the binary counter 288, which presets the $L_1$ counter 194, has stored therein the gage determined by the pushbutton closures on panel 276. As soon as the desired gage is preset into counter 194 in the manner described above, the gate 292 is enabled by the output pulse from counter 285 through lead 302. Consequently, output pulses from $L_1$ counter 194 may again actuate multivibrator 198 to trigger subtracter 162.

With the arrangement shown in FIG. 3, therefore, the gage may be changed by the operator while the mill is running, in contrast to prior art systems. However, it will be readily appreciated that the procedure is more complicated than that of the apparatus shown in FIG. 1B and involves considerably more circuitry.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a system for controlling a mill in accordance with the principle of constant volume of material entering and leaving the mill by comparison of actual measured material entry gage and calculated desired material entry gage, and wherein the calculation of desired material entry gage requires presetting of a counter for desired output gage; the improvement in means for presetting said counter comprising a device having a plurality of output leads which are energized in coded sequence as a function of the amount of mechanical rotation of an input shaft, means connecting said output leads to said counter to preset the same as a function of the leads which are energized, and dial means operatively connected to said shaft and rotatable while the mill is in operation, whereby the desired output gage of material from the mill may be altered by rotation of said dial means without shutting down the mill.

2. In a system for controlling a mill in accordance with the principle of constant volume of material entering and leaving the mill by comparison of actual measured material entry gage and calculated desired material entry gage, and wherein the calculation of desired material entry gage requires presetting of a binary counter for desired output gage; the improvement in means for presetting said binary counter comprising a binary digitizer having a plurality of output leads which are energized in binary coded fashion as a function of the amount of mechanical rotation of an input shaft, means connecting said output leads to said binary counter to preset the same as a function of the leads which are energized, and dial means operatively connected to said shaft and rotatable while the mill is in operation, whereby the desired output gage of material from the mill may be varied by rotating said dial means without shutting down the mill.

3. In a system for controlling a mill in accordance with the principle of constant volume of material entering and leaving the mill by comparison of actual measured material entry gage and calculated desired material entry gage, and wherein the calculation of desired material entry gage requires presetting of a counter for desired output gage; the improvement in means for presetting said counter comprising a digitizer device having a plurality of output leads which are energized in coded sequence as a function of the amount of mechanical rotation of an input shaft, means electrically connecting said output leads to said counter to preset the same as a function of the output leads which are energized, a Selsyn receiver mechanically connected to said shaft and responsive to an electrical signal for rotating said shaft, a Selsyn transmitter electrically connected to said receiver, and dial means connected to said Selsyn transmitter and rotatable by the operator of said mill, the arrangement being such that the desired output gage of material from the mill may be altered by rotation of said dial means without stopping the mill.

4. In a system for controlling a mill in accordance with the principle of constant volume of material entering and leaving the mill by comparison of actual measured material entry gage and calculated desired material entry gage, and wherein the calculation of desired material entry gage requires presetting of a counter for desired output gage; the improvement in means for presetting said counter comprising a plurality of leads connected to said counter and energizable in coded sequence to cause the counter to count a predetermined number of input pulses before producing an output pulse, means for energizing selected ones of said leads, and means for disconnecting said counter from said system for controlling a mill when the coded energization of said leads is changed.

5. In an electrical control system for a mill gage varying device based upon the principle of constant volume of material entering and leaving the mill and wherein the deviation from a desired output gage of the material is represented by an electrical signal proportional to $$G_1 - \frac{L_2}{L_1} G_{2d}$$

where $G_1$ is the actual gage of the material entering the bite of the mill, $L_2$ is the actual length of the material leaving the mill for a given volume entering the mill, $L_1$ is the actual length of the material entering the mill for said given volume, and $G_{2d}$ is the desired output gage of the material leaving the mill; the combination of a gage measuring device for deriving a binary electrical signal comprising a plurality of bits which together represent the quantity $G_1$, a first pulse generator for generating a number of pulses proportional to $L_1$, a second pulse generator for generating a number of pulses proportional to $L_2$, a first counter for counting the pulses from said first pulse generator, a second counter for counting the pulses from the second pulse generator and adapted to produce a binary electrical output signal comprising a plurality of binary bits which represent the quantity $L_2$, means for presetting said first counter to produce an output signal when the number of pulses counted by said first counter is equal in magnitude to $G_{2d}$, said latter-mentioned means comprising a binary digitizer having a plurality of output leads which are energized in binary coded fashion as a function of the amount of mechanical rotation of an input shaft, means connecting said output leads to said first counter to preset the same, dial means connected to said shaft and rotatable by the operator of said mill whereby the number of pulses equal to $G_{2d}$ may be varied by rotation of the dial means without shutting down the mill, and binary subtractor apparatus responsive to an output signal from said first counter for electrically subtracting the binary signals from said device and said second counter to produce an error signal for controlling said mill gage varying device.

6. In an electrical control system for a mill gage varying device based upon the principle of constant volume of material entering and leaving the mill and wherein the deviation from a desired output gage of the material is represented by an electrical signal proportional to $$G_1 - \frac{L_2}{L_1} G_{2d}$$

where $G_1$ is the actual gage of the material entering the bite of the mill, $L_2$ is the actual length of the material leaving the mill for a given volume entering the mill, $L_1$ is the actual length of the material entering the mill for said given volume, and $G_{2d}$ is the desired output gage of the material leaving the mill; the combination of a device for deriving an electrical signal which varies as a function of $G_1$, a first pulse generator for generating a number of pulses proportional to $L_1$, a second pulse generator for generating a number of pulses proportional to $L_2$, a first counter for counting the pulses from said first pulse generator and arranged to produce an output pulse when the pulses from said first pulse generator are equal to $G_{2d}$, a second counter for counting the pulses from the second pulse generator and adapted to produce an output signal which varies as a function of $L_2$, means including a device under the manual control of the operator for the mill for changing the count of said first counter without resetting the first counter to zero to thereby vary the quantity $G_{2d}$, and apparatus responsive to the output signal from said first counter for electrically subtracting the output signals from said device and said second counter to produce an error signal for controlling said mill gage varying device.

7. In an electrical control system for a mill gage varying device based upon the principle of constant volume of material entering and leaving the mill and wherein the deviation from a desired output gage of the material is represented by an electrical signal proportional to $$G_1 - \frac{L_2}{L_1} G_{2d}$$

where $G_1$ is the actual gage of the material entering the bite of the mill, $L_2$ is the actual length of the material leaving the mill for a given volume entering the mill, $L_1$ is the actual length of the material entering the mill for said given volume, and $G_{2d}$ is the desired output gage of the material leaving the mill; the combination of a device for deriving an electrical signal which varies as a function of $G_1$, a first pulse generator for generating a number of pulses proportional to $L_1$, a second pulse generator for generating a number of pulses proportional to $L_2$, a first counter for counting the pulses from said first pulse generator, a second counter for counting the pulses from the second pulse generator and adapted to produce an output signal which varies as a function of $L_2$, means operable when said mill is operating for presetting said first counter to produce an output signal when the number of pulses counted by said first counter is equal in magnitude to $G_{2d}$, and apparatus operable in response to the output signal from said first counter for electrically subtracting the output signals from said device and said second counter to produce an error signal for controlling said mill gage varying device.

References Cited
UNITED STATES PATENTS

| | | |
|---|---|---|
| 2,982,158 | 5/1961 | Orbom _____ 72—9 |
| 3,015,974 | 1/1962 | Orbom et al. _____ 72—9 |
| 3,054,311 | 9/1962 | Murtland _____ 72—9 |
| 3,121,354 | 2/1964 | Weremeychik et al. ____ 72—8 |
| 3,169,424 | 2/1965 | Branscom et al. _____ 72—9 |

CHARLES W. LANHAM, *Primary Examiner.*

A. RUDERMAN, *Assistant Examiner.*